United States Patent
Madiya et al.

(10) Patent No.: US 12,032,715 B2
(45) Date of Patent: Jul. 9, 2024

(54) SYSTEM AND METHOD FOR SECURING INFORMATION IN A DISTRIBUTED NETWORK VIA A DISTRIBUTED IDENTIFIER

(71) Applicant: BANK OF AMERICA CORPORATION, Charlotte, NC (US)

(72) Inventors: Tirupathirao Madiya, Telangana (IN); Archana Brahadeeswaran, Tamilnadu (IN); Yellaiah Ponnameni, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 366 days.

(21) Appl. No.: 17/567,938

(22) Filed: Jan. 4, 2022

(65) Prior Publication Data
US 2023/0214516 A1  Jul. 6, 2023

(51) Int. Cl.
| | |
|---|---|
| G06F 7/04 | (2006.01) |
| G06F 16/18 | (2019.01) |
| G06F 16/182 | (2019.01) |
| G06F 21/62 | (2013.01) |
| H04N 7/16 | (2011.01) |

(52) U.S. Cl.
CPC ...... *G06F 21/6227* (2013.01); *G06F 16/1805* (2019.01); *G06F 16/1844* (2019.01); *G06F 2221/2141* (2013.01)

(58) Field of Classification Search
CPC ............ G06F 21/6227; G06F 16/1844; G06F 16/1805
USPC ........................................................ 726/26
See application file for complete search history.

(56) References Cited

U.S. PATENT DOCUMENTS

| | | | |
|---|---|---|---|
| 6,330,671 | B1 | 12/2001 | Aziz |
| 10,567,168 | B2 | 2/2020 | Garagiola et al. |
| 10,715,323 | B2 | 7/2020 | Chan et al. |
| 2008/0082822 | A1 | 4/2008 | Starrett |
| 2014/0283089 | A1* | 9/2014 | Arya ................... G06F 21/6245 726/26 |
| 2018/0239897 | A1* | 8/2018 | Ventura ................... G06F 21/57 |
| 2019/0305932 | A1 | 10/2019 | Townsend |
| 2019/0347627 | A1 | 11/2019 | Lin et al. |

(Continued)

FOREIGN PATENT DOCUMENTS

| | | |
|---|---|---|
| CN | 111314086 A | 6/2020 |
| CN | 111859443 A | 10/2020 |

(Continued)

*Primary Examiner* — Jeffrey C Pwu
*Assistant Examiner* — Samuel Ambaye
(74) *Attorney, Agent, or Firm* — Moore & Van Allen PLLC; Andrew T. Wood

(57) ABSTRACT

Embodiments of the invention are directed to a system, method, or computer program product for an approach to securing information stored in a distributed network. The system allows for generating distributed identifiers for information entries, wherein the distributed identifiers mask the information entries using a hash function and the distributed identifiers are dispersed across distributed ledgers. The system also allows for originating nodes to access the information entries within the distributed identifiers, while permitting other nodes and domains to reference the distributed identifiers themselves instead of referencing the information entries.

18 Claims, 7 Drawing Sheets

(56) References Cited

U.S. PATENT DOCUMENTS

| | | | |
|---|---|---|---|
| 2020/0119917 A1 | 4/2020 | Christensen et al. | |
| 2020/0145202 A1 | 5/2020 | Michael | |
| 2021/0150521 A1 | 5/2021 | Pan | |
| 2021/0211468 A1 | 7/2021 | Griffin et al. | |
| 2022/0019901 A1* | 1/2022 | Saleh | ........................ H04L 9/50 |

FOREIGN PATENT DOCUMENTS

| | | |
|---|---|---|
| CN | 108848111 B | 9/2021 |
| NL | 2026713 A | 12/2020 |
| WO | 2020080933 A1 | 4/2020 |
| WO | 2022007243 A1 | 1/2022 |

* cited by examiner

SYSTEM AND METHOD FOR SECURING INFORMATION IN A DISTRIBUTED NETWORK VIA A DISTRIBUTED IDENTIFIER

BACKGROUND

Currently, entities store information entries associated with users across a multitude of domains. The domains may comprise repositories, data lakes, and warehouses or the like. As information entries are replicated across each domain, lack of tracking mechanisms for the information entries across the domains may lead to inconsistent information entries across the domains, information entries using too much storage to be replicated in multiple domains, or insecure information entries due to repeated storage. As such, there exists a need for a system and method for securing information in a distributed network via a distributed identifier.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for securing information in a distributed network via a distributed identifier.

Currently, entities store information entries associated with users across a multitude of domains. However, data storage, security, and tracking requirements require a more elegant way of storing the information entries such that storage is reduced, security is enhanced, and information entries are consistent across all of the domains. The system described herein is able to receive information entries, apply the information entries to a distributed ledger on a distributed network, generate distributed identifiers for the information entries, notify and broadcast the identifier generation to the distributed network, compile the distributed identifier with other distributed identifiers being generated to create a block, obtain consensus on the validity of the block by miner nodes, and append the block to the distributed ledger. In this way, only superusers or the domain who initiated the creation of the block will have access to the underlying information entry, while the other domains may have access to the distributed identifier and not the information entry. The domains may subsequently use the distributed identifier in future communications between the domains to reference the underlying information entry, without exposing the information entry to security threats, minimizing the amount of storage required for each domain, and ensuring each domain refers to the same underlying information entry.

Embodiments of the invention are directed to a system, method, or computer program product for securing information in a distributed network via a distributed identifier, the invention comprising receiving an information entry from one or more domains, wherein the one or more domains comprise one or more nodes of a distributed network, and wherein the information entry is provided to an originating node; storing the information entry on a distributed ledger of the distributed network; receiving a command to generate a distributed identifier for the information entry, wherein the distributed identifier is a generated number associated with the information entry based on information contained in the information entry; broadcasting the distributed identifier generation to a plurality of nodes in the distributed network upon receiving the command; and generating the distributed identifier, wherein the distributed identifier masks the information entry.

In some embodiments, the invention is further configured to compile the distributed identifier with one or more preexisting distributed identifiers into a block; initiate a block consensus, wherein the block consensus comprises a miner node verifying the originality of the distributed identifier and the one or more preexisting distributed identifiers of the block; obtain the block consensus from at least one of the miner nodes of the plurality of nodes, wherein the miner node has confirmed that the distributed identifier and the one or more preexisting distributed identifiers is unique by comparing the block to any recorded distributed identifiers in the distributed ledger; and transmit the block to the distributed network, wherein the block is appended to the distributed ledger.

In some embodiments, or in combination with any of the previous embodiments, the invention further comprises initiating the distributed identifier generation; receiving the information entry from the domain; applying a hash function to one or more information entries, wherein each information entry comprises one or more character strings; applying a summing function to each of the outputs of the hash function, wherein the hash function generates a value for each character string based on a hash table; and summing with a maximum distributed identifier, wherein the maximum distributed identifier is determined from the distributed ledger.

In some embodiments, or in combination with any of the previous embodiments, comparing the distributed identifier to the one or more pre-existing distributed identifiers in the distributed network further comprises initiating the generation of a new distributed identifier if the distributed identifier is not unique.

In some embodiments, or in combination with any of the previous embodiments, receiving from the domain the command to generate the distributed identifier for the information entry further comprises miner nodes of the distributed network prioritizing the command to generate the distributed identifier with a plurality of commands to generate distributed identifiers.

In some embodiments, or in combination with any of the previous embodiments, the distributed network and distributed ledger are controlled by an entity, such that only a superuser and the domain are capable of accessing the information entry associated with the distributed identifier.

In some embodiments, or in combination with any of the previous embodiments, masking the information entry further comprises supplying a hash table to the originating node and a superuser, while not allowing access to the hash table by other nodes in the distributed network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
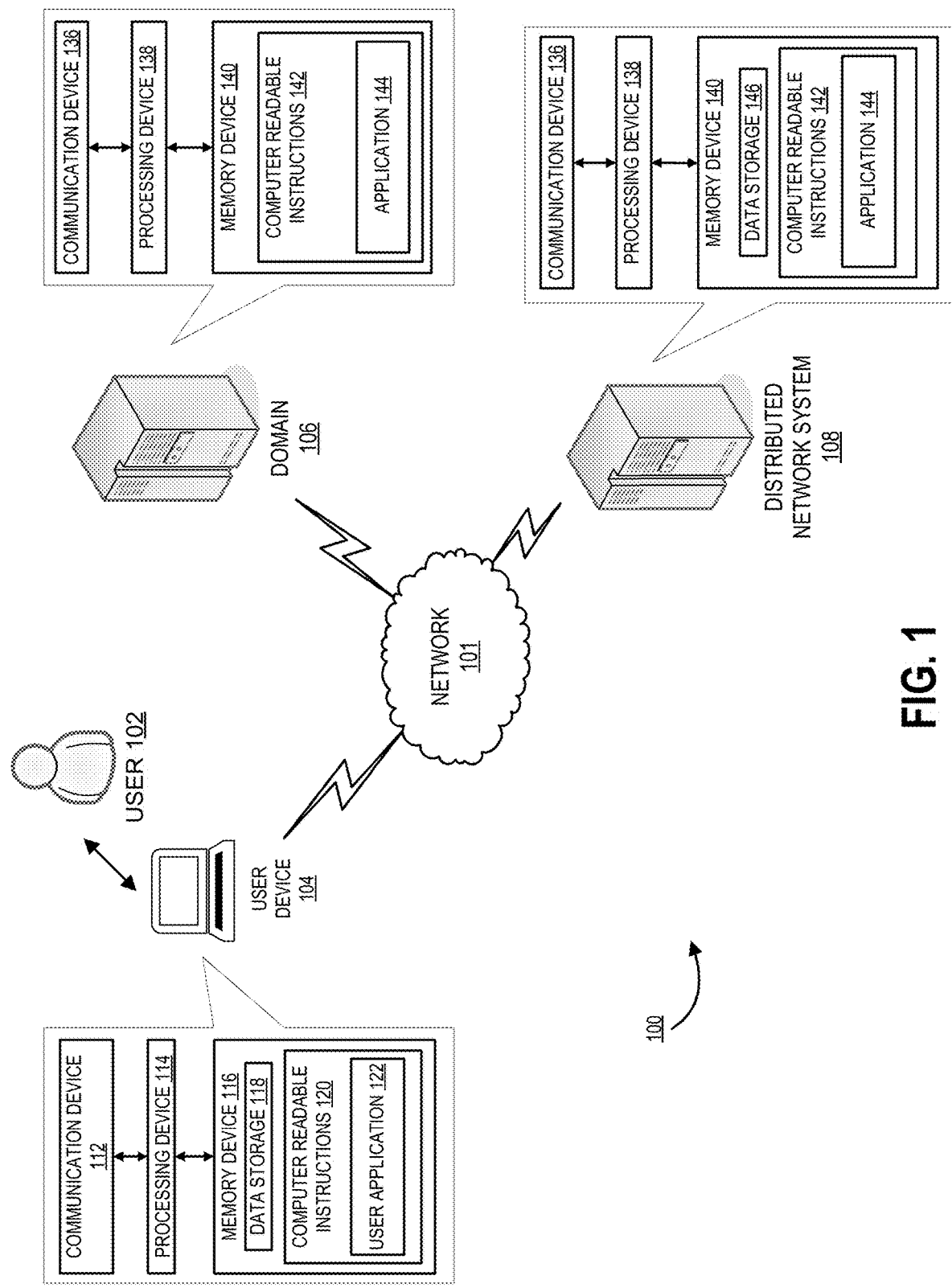
Figure 2A:
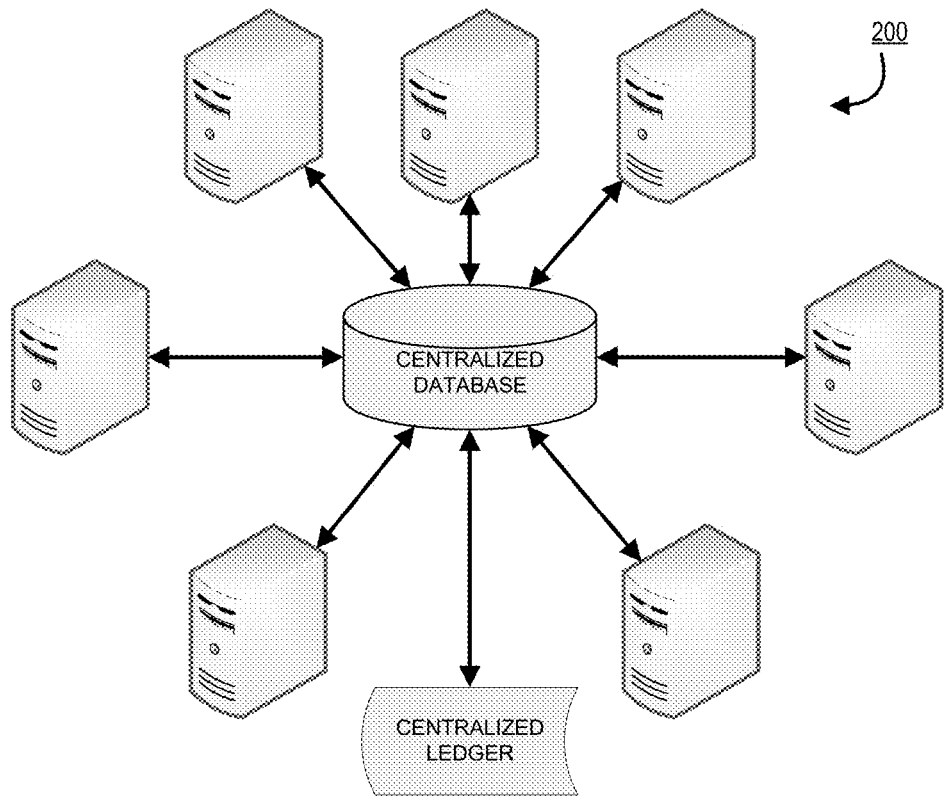
Figure 2B:
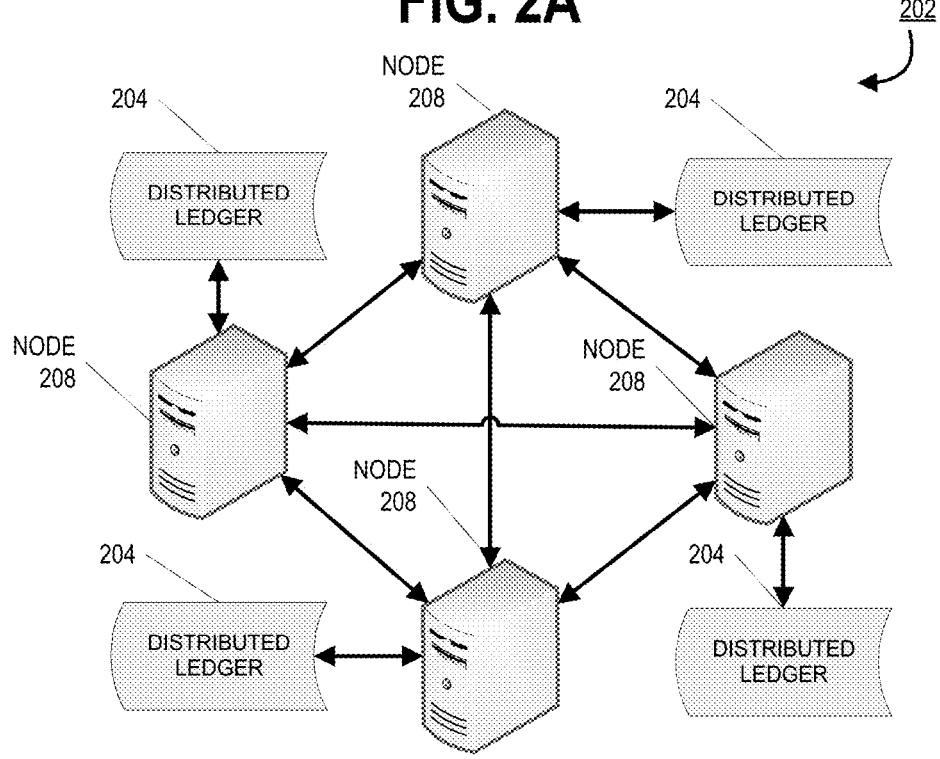
Figure 3:
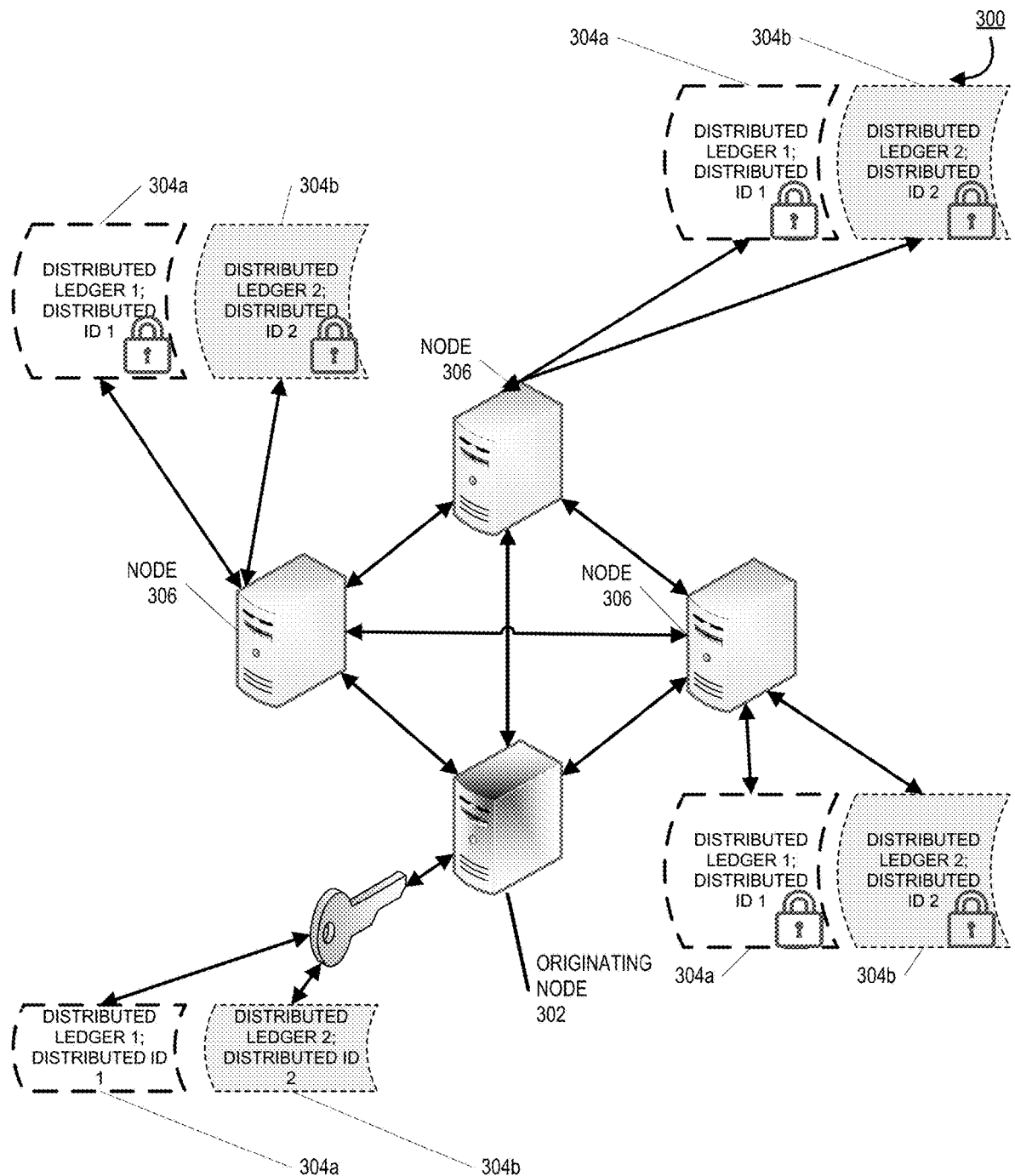
Figure 4:
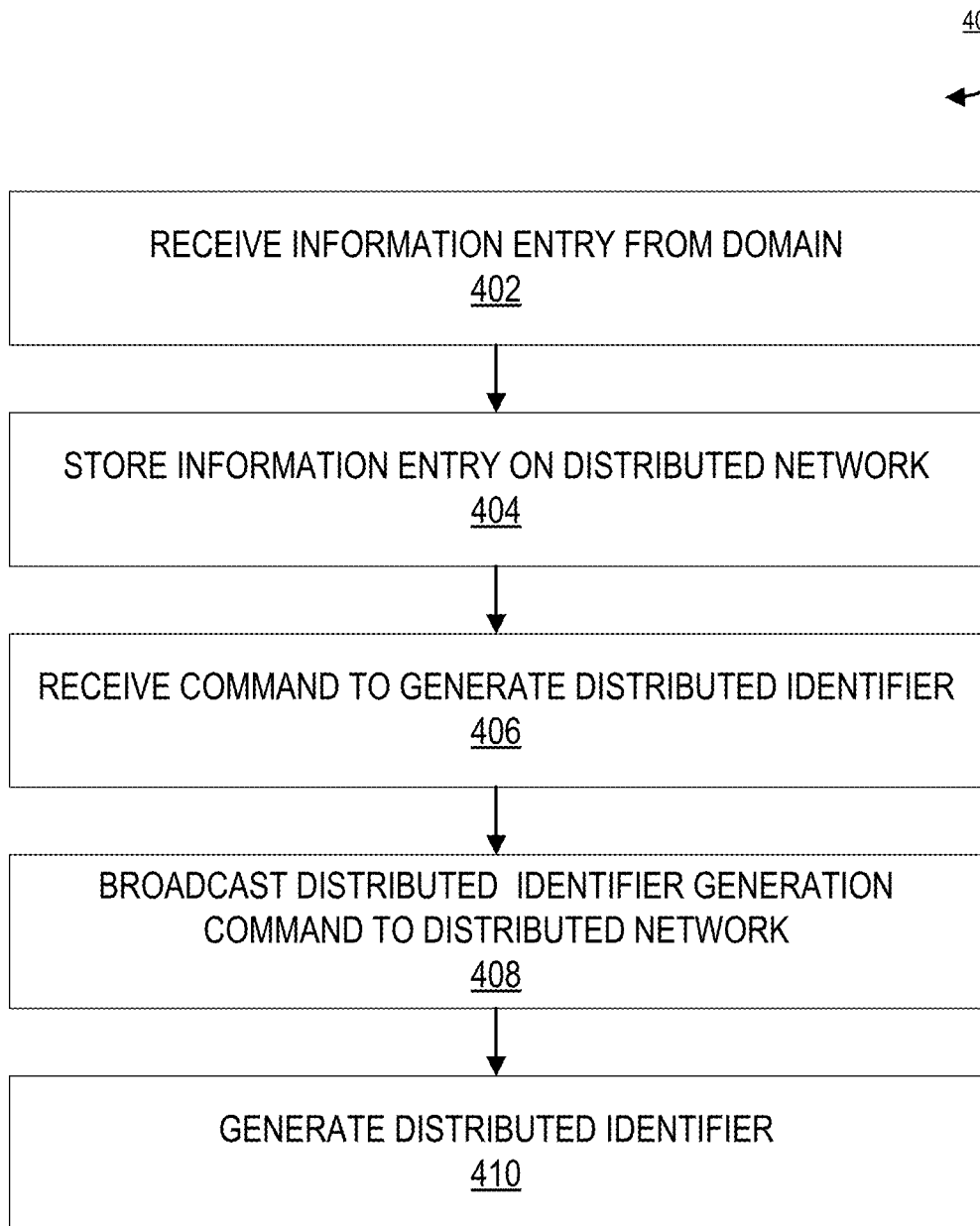
Figure 5:
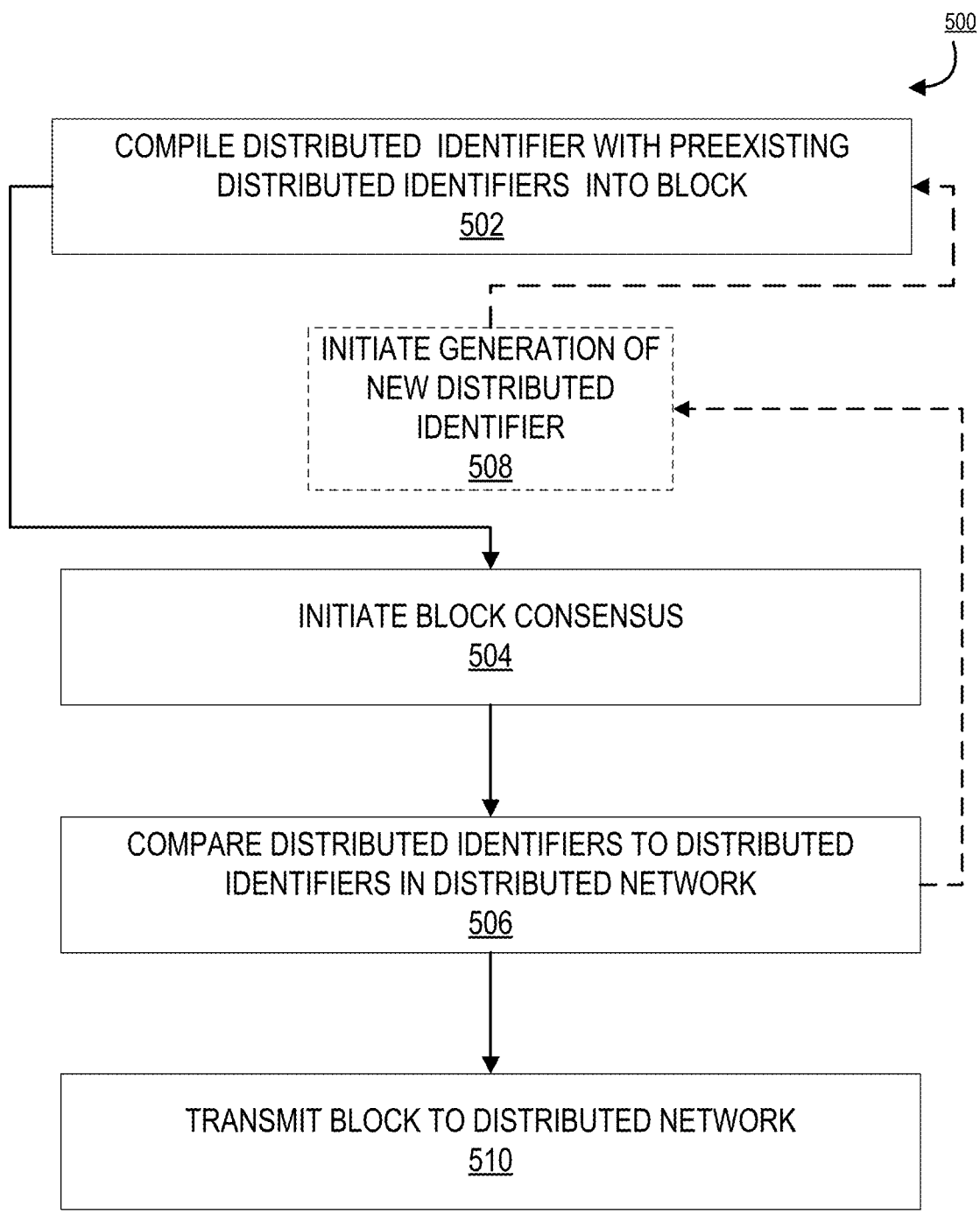
Figure 6:
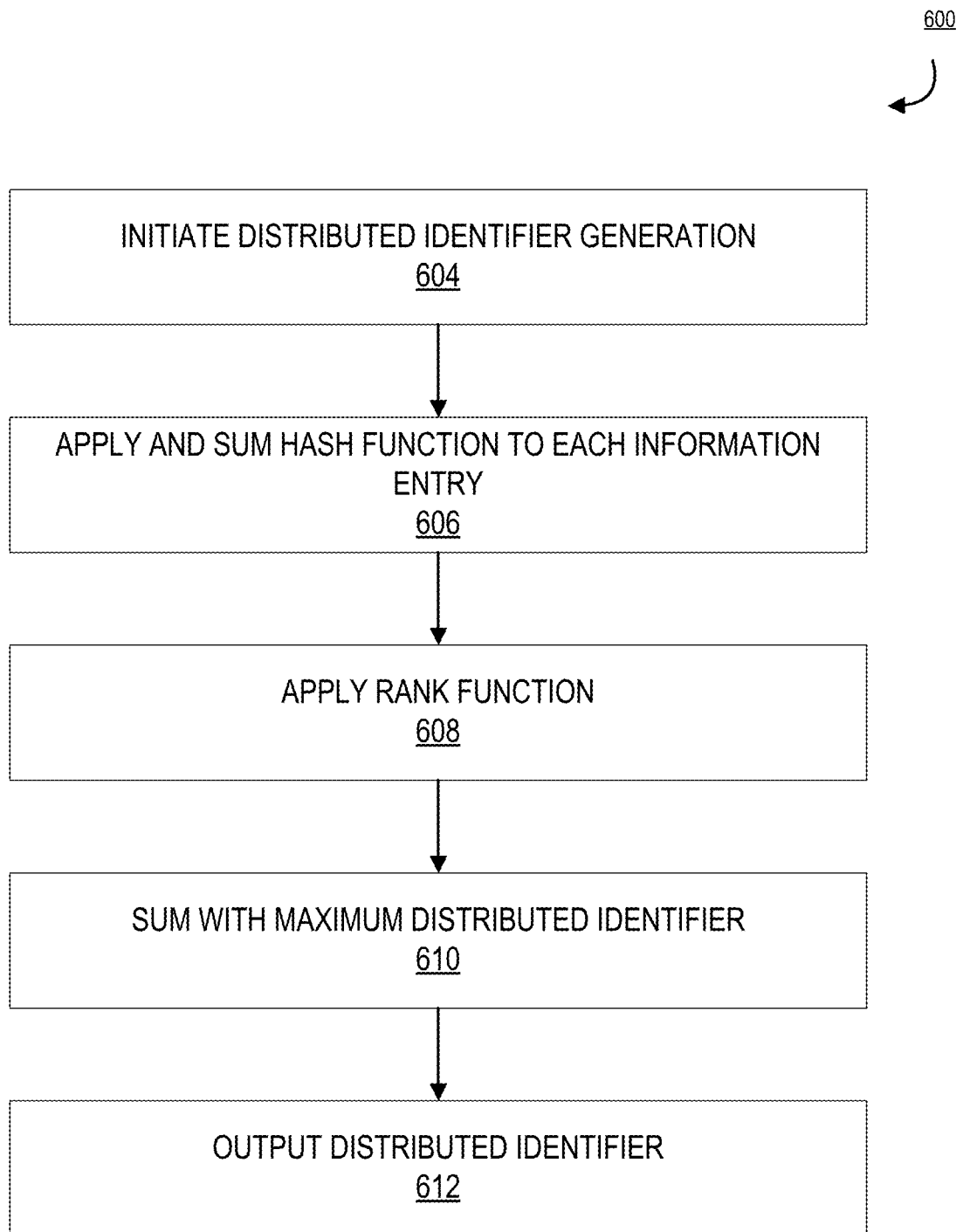
Figure 7:
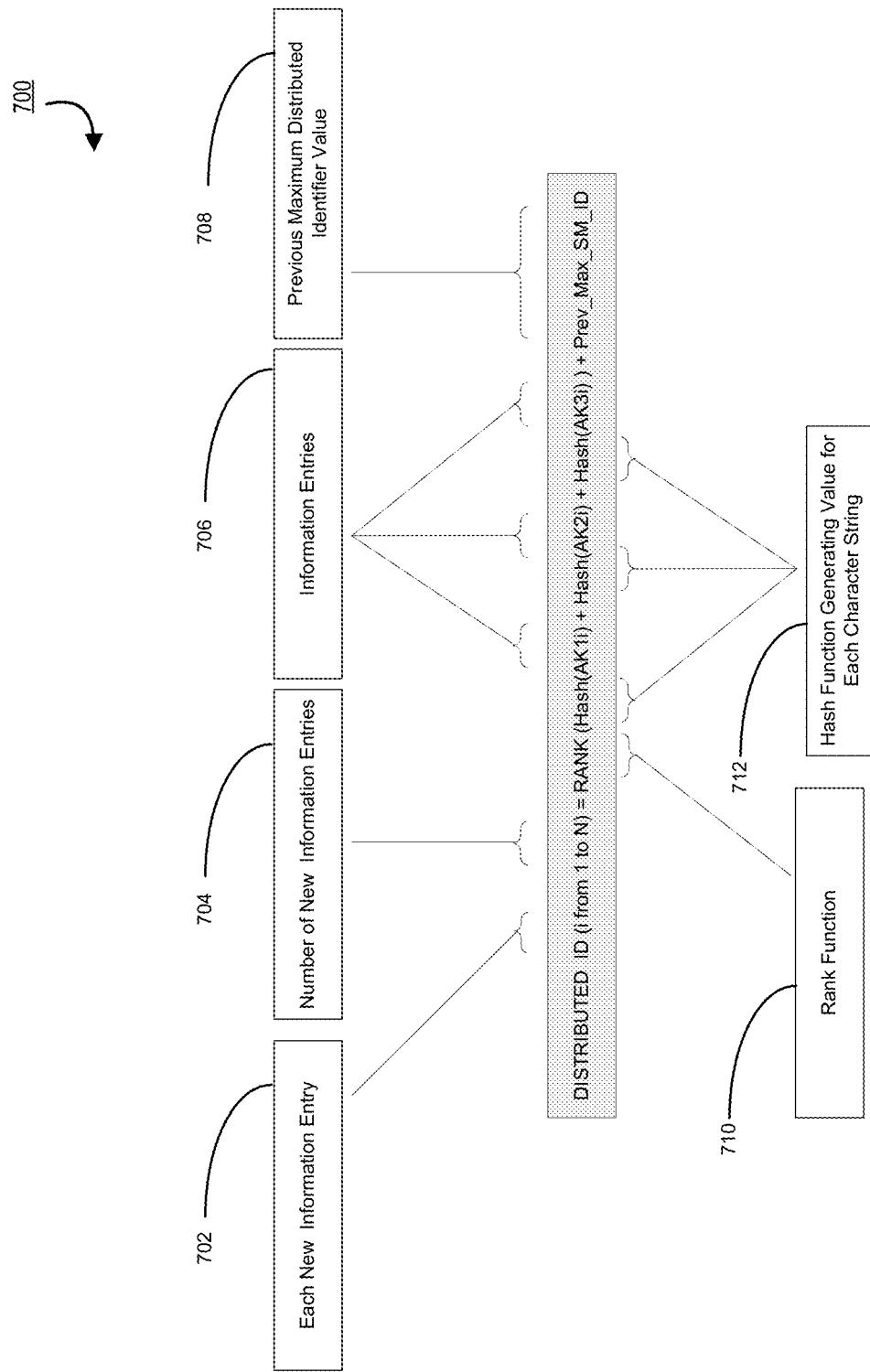

Having thus described embodiments of the invention in general terms, reference will now be made to the accompanying drawings, wherein:

FIG. 1 illustrates a network environment in which the processes described herein are implemented, according to embodiments of the present invention;

FIG. 2A and FIG. 2B illustrate a centralized database and distributed network environment, respectively, in which the processes described herein are implemented, according to embodiments of the present invention;

FIG. 3 illustrates a distributed network system, according to one embodiment of the present invention;

FIG. 4 is a block diagram of a method for securing information in a distributed network via a distributed identifier;

FIG. 5 is a block diagram of a method for reaching a consensus and transmitting distributed identifiers across a distributed network;

FIG. 6 is a block diagram of a method for method for generating a distributed identifier by transforming an information entry; and FIG. 7 is a block diagram of a distributed identifier generation function.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

Embodiments of the invention are directed to a system, method, or computer program product for securing information in a distributed network via a distributed identifier. The system allows for a domain or a user associated with a domain to input an information entry on a distributed ledger, wherein the distributed ledger is controlled by the entity, and the information entry is used as an input to generate a distributed identifier by miner nodes of the system. Prior to generating the distributed identifier, the system broadcasts to the distributed network that the information entry will be subjected to transformation into a distributed identifier. This broadcasting allows miner nodes to verify if the information entry exists across the nodes of the ledger, and if not, the distributed identifier is generated. Once the distributed identifier is created, it is compiled with other newly created (e.g. preexisting) distributed identifiers and distributed along the distributed network to the distributed ledgers of the network. As such, only the domain from which the distributed identifier was requested to be generated from and one or more superusers have access to the information entry masked by the distributed identifier. Prior to adding the block to the distributed ledger, the block may be validated or verified for accuracy by one or more miner nodes of the distributed ledger.

A "user" as used herein may refer to any entity or individual associated with the distributed network system. In some embodiments, a user may be a computing device user, a phone user, a mobile device application user, a financial institution customer (e.g., an account holder or a person who has an account (e.g., banking account, credit account, or the like)), a system operator, database manager, a support technician, and/or employee of an entity. In some embodiments, identities of an individual may include online handles, usernames, identification numbers (e.g., Internet protocol (IP) addresses), aliases, family names, maiden names, nicknames, or the like. In some embodiments, the user may be an individual or an organization (i.e., a charity, business, company, governing body, or the like).

In accordance with embodiments of the invention, the term "entity" may be used to include any organization or collection of users that may interact with a distributed network. An entity may refer to a business, company, or other organization that either maintains or operates the system or requests use and accesses the system. "Entity" may be used to include any organization that processes financial transactions including, but not limited to, banks, credit unions, savings and loan associations, investment companies, stock brokerages, resource management firms, insurance companies or the like.

The term "distributed network," as used herein, refers to a plurality of computer systems known as "nodes", each of which is in communication with one or more of the other nodes. Nodes may write a data "block" to a distributed ledger, the block comprising data regarding a resource transfer, electronic resource, accounts associated with a user such as checking, savings, loans, or the like. The blocks may further comprise information about a user such as name, address, phone number, SSN, user identification records, account preferences, and so forth. The blocks may further comprise data and/or metadata. In some embodiments, only designated "miner" nodes may write or obtain a consensus on distributed identifiers to the distributed ledger. Furthermore, these miner nodes are configured to determine if the information entry already exists in the distributed ledgers and is associated with a distributed identifier. In other embodiments, all nodes have the ability to write to the distributed ledger. In some embodiments, one or more nodes may be designate as "superuser" nodes, such that nodes bearing this distinction are capable of modifying blocks in the distributed ledger. In an instance where blocks need error correcting, refinement in the information entry due to incorrect information, and so forth. In some embodiments, the block may further comprise a time stamp and a pointer to the previous block in the chain. In some embodiments, the block may further comprise metadata indicating the node that was the originator of the distributed identifier. In this way, an entire record is not dependent on a single database which may serve as a single point of failure; the distributed network will persist so long as the nodes on the distributed network persist.

The term "distributed ledger" as used herein, refers to a decentralized electronic ledger of blocks which are authenticated by a federated consensus protocol, a copy of which is stored on multiple nodes of the distributed network. Multiple computer systems within the distributed network each comprise a copy of the entire ledger of records.

Embodiments of the invention as described herein may utilize one, several, or a combination (i.e. hybrid) of a number of different consensus algorithms to ensure the integrity of the distributed ledger within the block chain. In some embodiments, the consensus mechanism may be a "proof of work" ("PoW") protocol, in which the nodes perform a series of calculations to solve a cryptographic puzzle. In other embodiments, the consensus mechanism may be a "proof of stake" ("PoS") protocol or delegated proof of stake protocol. Other examples of consensus mechanisms which may be utilized, as understood by one of ordinary skill in the art, are proof of capacity ("PoC"), proof of activity ("PoA"), proof of burn ("PoB"), proof of elapsed time ("PoET"), or the like. For instance, in order to validate a pending data record, the nodes may be required to calculate a hash via a hash algorithm (e.g. SHA256, SHA3-256, SHA-3, SHA3-512, Keccak-256, or the like) which satisfies certain conditions set by the system. Calculating a hash in this way may be referred to herein as "mining," and thus a node performing the mining may be referred to as "miners" or "miner nodes."

As used herein, a "domain" refers to a singular or group of data repositories, data storage centers, data lakes, or the like, each may be associated with certain lines of businesses, account types, or the like. Each domain contains certain groups of systems of frequent communication with one another with other groups of systems within an entity to which communication is required. In some embodiments, each domain may comprise all information entries associated with one line of business, for example one domain may be associated with card transactions, while another domain may be associated with loan account information, and so forth. In such an embodiment, an entity may require gathering information entries associated with a user for said user's loan accounts, checking accounts, investment accounts, or the like. The entity may wish to display all of this information onto a graphical user interface of a user device, and as such the method of the incumbent system is to communicate with one or more domains, whereby certain information entries from the some domains may be transmitted individually to a centralized location for presentation on the user device. Embodiments of the present invention improve upon the incumbent system by allowing the centralized location or user device to receive and display information entries by requesting the information only by the distributed identifier, thereby minimizing the amount of sensitive information transmitted across the entity. Each of the domains would comprise copies of distributed ledgers, wherein the distributed ledgers make reference to distributed identifiers.

As used herein, a "information entry" refers to any data contained within the network of an entity, such that the data would need to be stored on multiple domains. The information entry may comprise an account number (such as a checking, savings, investment, retirement, or any other type of financial account), personal information such as name, address, phone number, internet protocol ("IP") addresses, social-security numbers, personal biometric data, employment information, credit information, or the like. Information entries may also comprise databases of information regarding previous interactions with an entity, such as closed accounts, saved voice or text messages and interactions to and from an entity, or the like. The present invention may be configured to process one or more domains of information entries which presently stores information in a centralized ledger, and where the entity desires an entire domain or multiple domains to be transformed into a distributed network.

A "distributed identifier" as used and explained in much further detail herein, is a transformation logic executed by the system, configured to receive information entries and output unique identifiers. As such, these unique identifiers are distributed throughout the distributed network and used for harmonization and security between nodes of the distributed network and/or domains. The distributed identifier is configured to cloak or mask the underlying information entry to all domains with the exception of the originating domain and a superuser. The distributed identifier is preferably created by miner nodes across the distributed network.

FIG. 1 illustrates a system that includes specialized systems and devices communicably linked across a distributive network of nodes required to perform a method for securing information in a distributed network via a distributed identifier. FIG. 1 provides an environment 100 for the system and, in accordance with one embodiment of the present invention.

As illustrated in FIG. 1, the distributed network system 108 is operatively coupled, via a network 101 to the user device 104, and to the domain 106. In this way, distributed network system 108 can send information to and receive information from the user device 104, and the domain 106. It shall be noted that in some embodiments of the invention, domain 106 is merely one or more nodes along a distributed network system 108, and as such distributed network system 108 comprises domain 106. FIG. 1 illustrates only one example of the system environment 100, and it will be appreciated that in other embodiments one or more of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network.

In some embodiments, the user 102 is an individual who has the ability and/or authority to access a distributed network system 108, domain 106, or the like. Those skilled in the art will appreciate that at least some example embodiments contemplate multiple such users. In some embodiments, the user 102 has a user device, such as a mobile phone, tabled, computer or the like. FIG. 1 also illustrates a user device 104. The user device 104 may be any communication device such as a smart phone, a telephone, a tablet, a computer, or the like, but is preferably a computing device or terminal. User device 104 can perform computing functions, and the device may be used by the user to access the system directly or through an application, online portal, internet browser, virtual private network, or other connection channel. The device may be a computer device within a network of connected computer devices that share one or more network storage locations.

The user device 104 generally comprises a communication device 112, a processing device 114, and a memory device 116. The processing device 114 is operatively coupled to the communication device 112 and the memory device 116. The processing device 114 uses the communication device 112 to communicate with the network 101 and other devices on the network 101, such as, but not limited to the distributed network system 108, and the entity server 106. As such, the communication device 112 generally comprises a modem, server, or other device for communicating with other devices on the network 101.

As further illustrated in FIG. 1, the user device 104 comprises computer-readable instructions 120 stored in the memory device 116, which in one embodiment includes the computer-readable instructions 120 of a user application 122 and data storage 118. A user device 104 is preferably a personal computing device or terminal, but it may be any communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, voice assistants, laptop computers, cameras, video recorders, audio/video player, radio, GPS devices, any combination of the aforementioned, or the like. Although only one user device 104 is depicted in FIG. 1, the system environment 100 may comprise a plurality of user devices 104. In some embodiments of the invention described herein, a plurality of user devices 104 is used. In other embodiments, user devices 104 are not necessary for the functionality of the system and may not be integrated into the system in any appreciable manner.

As illustrated in FIG. 1, the distributed network system 108 generally comprises a communication device 136, a processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity server 106, and the user device 104. As such, the communication device 136 generally comprises a modem, server, or other device for communicating with other devices on the network 101.

As further illustrated in FIG. 1, the distributed network system 108 comprises computer-readable instructions 142 stored in the memory device 140, which in one embodiment includes the computer-readable instructions 142 of an application 144. In some embodiments, memory device 140 includes data storage 146 for storing data related to the system environment, but not limited to data created and/or used by the application 144.

Embodiments of the distributed network system 108 may include multiple systems, servers, computers or the like maintained by one or many entities. FIG. 1 merely illustrates one of those systems that, typically, interacts with many other similar systems to form the distributed network and thereby has the ability to work on the distributed ledger, either in an authorizing or modifying capacity. In one embodiment of the invention, the distributed network system 108 is operated by a second entity that is a different or separate entity from the domain 106. In some embodiments, the domain 106 may be part of the distributed network system 108. Similarly, in some embodiments, the distributed network system 108 is part of the domain 106.

In one non-limiting example of the distributed network system 108 the memory device 140 stores, an application 144 and a distributed ledger. In some embodiments the distributed network stores data including, but not limited to, distributed identifier logic and rules, user identifications, user legal identification, associated logic and rules, user account information entries, information entries regarding user preferences, resource allocation rules, resource allocation data, one or more information entry rules, related data, or the like. In one embodiment of the invention, both the application 144 and the distributed network 108 may associate with the applications having computer executable program code that instructs the processing device 138 to operate the communication device 136 to perform certain communication functions described herein. In one embodiment, the computer-executable program code of an application associated with the distributed network and application 144 may also instruct the processing device 138 to perform certain logic, data processing, and data storage functions of the application.

The processing device 138 is configured to use the communication device 136 to gather data, such as data corresponding to information entries such as distributed identifiers, information entries, blocks, or other updates to the distributed ledger from various data sources such as other distributed network systems. It shall be noted that communication device 136 may be configured different for each node of the distributed network system 108. For example, distributed networks system 108 may have certain nodes which are defined to be superusers, and such superusers may be configured to modify or alter the distributed ledger on the distributed network system 108 in a way in which other nodes are unable to. As such, an additional layer of malfeasance protection in enabled in the system by preventing modification by other nodes. The processing device 138 stores the data that it receives in its copy of the distributed ledger stored in the memory device 140. Distributed networks system 108 also comprises one or more miner nodes, in which the miner nodes are configured to execute the distributed identifier process, validate or reach a consensus on new additions to the distributed ledger such as information entries or distributed identifiers.

In the embodiment illustrated in FIG. 1 and described throughout much of this specification, the application 144 may perform a method for securing information in a distributed network via a distributed identifier. Application 144 may execute computer readable instructions configured receive information entries from one or more domains and/or nodes and store the entries on a distributed ledger of a distributed network. Application 144 may then be configured to initiate a generation of distributed identifiers. After such distributed identifier generation is initiated, the application 144 may notify or broadcast to a network of miner nodes that a particular information entry is undergoing the distributed identifier process, in order for the miner nodes to verify whether or not the information entry already exists on a ledger of the distributed network. The application 144 may then utilize miner nodes to execute a method to generate the distributed identifier, using sums and hash functions as will be described in more detail herein.

The distributed identifier, once generated by application 144, is compiled with other distributed identifiers generated or created by application 144 for a given time period, and a block is created by compiling these distributed identifiers. It is important that the distributed identifier which has been generated by application 144 is unique and not identical to any other smart identifiers previously generated by application 144. As such, the block is distributed to all the nodes of the distributed network and a consensus is performed. A consensus may be performed by miner nodes only, and the consensus works to compare each of the generated distributed identifiers within the block to other distributed identifiers and blocks within the system (e.g. distributed ledgers). Comparison can be accomplished in numerous ways, including but not limited to searching distributed ledgers for objects equal to the object being compared (wherein object(s) are information entries or distributed identifiers), parsing the distributed ledgers for distributed identifiers and comparing a single digit of each object or string at a time, comparing portions of objects or strings with objects or strings on the distributed ledger, or the like.

Once a block has reached consensus, using application 144 or a combined group of nodes or miner nodes using application 144, the block is distributed and appended to the distributed ledger, such that a copy of the block resides on each copy of the distributed ledger. As such, each copy of the distributed ledger comprises a distributed identifier associated with an information entry, wherein the user devices 104, domains 106, and/or distributed network system 108 may identify a particular information entry not by the information of which it contains, but rather by the distributed identifier itself. The information contained in the distributed identifier is fully masked by the distributed identifier, such that only the domain 106 or node which generated the distributed identifier or a superuser with capability to modify and/or view the contents of a distributed ledger may be capable of seeing the information entry associated with the distributed identifier.

As illustrated in FIG. 1, the domain 106 is connected to the distributed network system 108. In this way, while only one domain 106 is illustrated in FIG. 1, it is understood that multiple domains may make up the system environment 100. The domain 106 generally comprises a communication device 136, a processing device 138, and a memory device 140. The domain 106 comprises computer readable instructions 142 stored in the memory device 140, which in one embodiment includes the computer readable instruction 142 of an application 144. The domain 106 may communicate with the distributed network system 108.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 200, in accordance with one embodiment of the present invention. The centralized database architecture comprises multiple nodes from one or more sources that converge into a centralized database. The system, in this embodiment, may generate a single centralized ledger for information entries or data received from the various nodes. FIG. 2B provides a general distributed network system environment architecture 202, in accordance with one embodiment of the present invention. Rather than utilizing a centralized database of data for storing information entries, as discussed above in FIG. 2A, various embodiments of the invention may use a decentralized distributed network configuration or architecture (block chain) utilizing a distributed network system as shown in FIG. 2B.

A distributed ledger is a distributed database, distributed across a distributed network, that maintains a list of data blocks. Data block may comprise information entries such as real-time resource availability associated with one or more users, information entries such as account numbers, personal information, or the like, the security of which is enhanced by the distributed nature of the distributed network. A distributed network system typically includes several nodes, which may be one or more systems, machines, computers, databases, data stores or the like operably connected with one another. In some cases, each of the nodes or multiple nodes are maintained by different entities. A distributed network typically works without a central repository or single administrator. One well-known application of a distributed network is the public ledger of resource transfers for cryptocurrencies. Another application of a distributed network system as will be discussed herein is for use in distributivity storing information entries such as account numbers, type of account, personal information, user preferences, or the like. The data blocks recorded in the distributed network are enforced cryptographically and stored on the nodes of the distributed network.

A distributed network provides numerous advantages over traditional databases. A large number of nodes of a distributed network may reach a consensus regarding the validity of an information entry, distributed identifier, or block comprising multiple distributed identifiers. As such, the distributed identifier may be referenced, validated, and cleared by one participant with a high level of confidence after the consensus has been reached.

As mentioned above and referring to FIG. 2B, a distributed network system 202 is typically decentralized—meaning that a distributed ledger 204 is maintained on multiple nodes 208 of the distributed network 202. One node in the distributed network may have a complete or partial copy of the entire ledger, set of ledgers, or set of distributed identifiers and/or blocks recorded on the distributed ledger. Recorded distributed identifiers in some distributed ledgers 204 may comprise information regarding account information, personal information, and so forth. Distributed identifier generation is initiated at a node of a distributed network and communicated to the various nodes of the distributed network. Miner nodes may validate a distributed identifier, add the distributed identifier or block comprising multiple distributed identifiers to its copy of the distributed ledger, and/or broadcast the distributed identifier, its validation (in the form of a block) and/or other data to other nodes or miner. This other data may include time-stamping, such as is used in some distributed ledgers.

FIG. 3 illustrates a distributed network system 300, according to one embodiment of the invention as will be discussed herein. Similar to FIG. 2B, it shall be noted that distributed network system 300 is typically decentralized—meaning that distributed ledgers 304a and 304b are maintained on multiple nodes 306 of the distributed network 300. In this embodiment, it shall be appreciated that distributed ledgers 304a and 304b are both distributed amongst each node 306. For purposes of simplification and illustration, this embodiment only depicts two distributed ledgers 304a, 304b, but it shall be appreciated that a large plurality of distributed ledgers may be distributed amongst the nodes 306 of the distributed network system 300. In this way, each distributed ledger may comprise, for example, a ledger for a singular account of a singular user of an entity. Each user of an entity may have a unique ledger associated with each account associated with the user. Or in some embodiments, a particular distributed ledger associated with a user may comprise contact information, whereas other distributed ledgers may comprise the information associated with an account of the user. In other embodiments, a singular distributed ledger 304a may comprise all information entries associated with a user, such as account information or personal information, or the like, and additional distributed ledgers 304b may comprise all information associated with another user. In yet additional embodiments, a distributed ledger 304a may comprise all information entries associated with a plurality of users, but wherein each share a characteristic or common domain like "savings account". One node in the distributed network may have a complete or partial copy of the entire ledger or set of distributed identifiers and/or blocks on the distributed ledger.

An originating node 302 is representative of a node or domain wherein the information entry is obtained by the entity, for example a node associated with a user device of particular line of business which opens an account for a user, or inputs a user's personal information. The originating node 302 may be a miner node. In some embodiments, originating node 302 has the capacity to access entries on the distributed ledgers 304a, 304b, or in other embodiments provide the other nodes or domains or users in the network with the necessary access to the information entry as comprised in the distributed identifier. It shall be noted that, as depicted, each ledger comprises a distributed identifier for each distributed ledger 304a, 304b. In some additional embodiments, each distributed ledger 304a, 304b may comprise multiple information entries, each information entry with their own distributed identifier.

FIG. 4 illustrates a block diagram 400 of a system and method for securing information in a distributed network via a distributed identifier, in accordance with some embodiments of the present invention. As illustrated in block 402, the system receives an information entry from a domain. Domains are typically data domains, which comprise repositories for information, such as data lakes, server farms, or the like. In such domains, large amounts of information are held and stored for use by the entity systems. Such types of information may include transaction or resource balance information, but also may comprise information entries such as accounts associated with a user (e.g. a checking, savings, investment, retirement account, loan, or the like), information about the user (e.g. name, address, username, password, phone number, or the like), data collected on user devices associated a user (e.g. IP address, geo-location, app usage data, or the like), and so forth.

Maintaining these types of information entries may use a large amount of storage in the domain, bandwidth to process the information in the domain, etc. As previously noted, there may be multiple domains within an entity, and it is often advantageous for each of these domains to comprise one or more distributed ledgers with information entries which are replicated across these numerous domains. In this way, information entries are stored across multiple nodes, and other nodes are capable of validating or verifying the contents of the distributed ledger(s) on a regular basis to ensure that the ledgers have not been tampered or contain any errors.

In block 402, a domain may process a request, for example, to create an information entry. The information entry, as previously noted, could be an account for a user, or details regarding a user's person information, or in some embodiments the information entry could be data regarding a resource transfer or transaction that has occurred on an account. The information entry is received by the system, and the system is configured to store the information entry on a distributed network as shown in block 404. The information entry may be stored in a distributed ledger such that the distributed ledger is appended or modified by a miner node or originating node of the information entry, whereinafter the revised distributed ledger is authenticated by a miner node and distributed to the other nodes of the distributed network. The embodiments of the invention described herein are directed towards use of a controlled distributed network, such that all nodes, superusers, and miner nodes of the distributed network are within the control of an entity, and wherein all copies of the distributed ledger are held within those nodes. It is considered, however, that additional embodiments of the invention may be applicable to any number of types of distributed networks and distributed ledgers.

The process continues in block 406 where the system receives a command to generate a distributed identifier. As previously described, the system is configured, at a node or a domain, to initiate a request to generate a distributed identifier. Once a command is received to generate a distributed identifier, the system may take action to begin the generation immediately, or in some embodiments of the invention the system may receive the command to generate the distributed identifier, but place the action for generation into a queue such that actual generation of the distributed identifier only occurs on a periodic basis (such as hourly, every 2 hours, daily, weekly, or the like). In other embodiments, the system may place the action for generation into a queue and only perform actual generation of the distributed identifier once the queue is filled, such that the system is configured to generate a pre-determined number of distributed identifiers each time.

The process continues with block 408, in which the system broadcasts to the distributed network a message that distributed identifier generation is in a queue and will be occurring at a later time for a given distributed ledger. The broadcast may be specific, such that the specific distributed ledger is identified in the broadcast, or the broadcast may be general such that no specific distributed ledger is identified. The broadcast may be a simple notification, or it may involve an intermediate step such that the specific distributed ledger identified in the broadcast is flagged. The broadcast step in block 408 may also comprise the miner nodes of the system receiving the information entry and parsing the distributed ledger to ensure that a given information entry is not already associated with a distributed identifier. In some cases, the information entry may be a duplicate information entry, and as such the system is configured to halt the generation of the distributed identifier. In such embodiments, the system may modify/and or associate the new information entry with identical information with the distributed identifier elsewhere on the system. In embodiments where the information entry is found to not be a duplicate of any other information entry, the process continues in block 410.

Block 410 continues by completing the distributed identifier process. The intricacies of the process comprising block 410 will not be discussed as it pertains to FIG. 4, but instead will be discussed in greater detail in FIGS. 5-6. What is noted in FIG. 4 is that by completing the distributed identifier generation, the distributed ledger or distributed ledger entry is now associated with a distributed identifier, such that the distributed identifier and distributed ledger now comprise the information entry, and end users of the network will be able to link and relate different domains of data using the distributed identifier which is consistent across all nodes of the distributed network. The distributed identifier for the information entry will be generated by a node in the distributed network, or a user in the distributed network, and due to the nature of the distributed identifier, all other users in the network will not be able to see any of the underlying information entries associated with the distributed identifier; they will only be able to see and reference the distributed identifier itself.

FIG. 5 illustrates a block diagram of a method for reaching a consensus and transmitting distributed identifiers across a distributed network. The process begins in 502, where one or more distributed identifiers are compiled with preexisting distributed identifiers in a distributed network, each distributed identifier having been previously generated by a miner node. Across an entity with many domains, nodes, lines of business, or the like, it should be appreciated that at any given time a plurality of distributed identifiers may be generated by numerous users. To efficiently transmit and store the distributed identifiers across a plurality of ledgers, it is advantageous to combine several distributed identifiers into a block. As such, these preexisting distributed identifiers which are pending and not yet added to a block may be combined with the present distributed identifier to form the block. Thereinafter, the block is sent to miner nodes across the distributed network such that the block can be recorded to the distributed ledgers. Each block may comprise distributed identifiers for one particular type of information entry, such as checking accounts, for multiple users during a given time. Or in other embodiments, each block may comprise distributed identifiers for several different types of information entries, but for only a single user. In yet additional embodiments, the system may be agnostic to the composition of types of distributed identifiers or users' ledgers to which they belong. In any case, the system is configured to compile distributed identifiers into a block on a periodic basis, either based on amount of time (e.g. hourly, daily, weekly, or the like) or the system may be configured to create a queue of distributed identifiers, and once the queue reaches a certain level (e.g. a pre-determined number of distributed identifiers) the system will form a block compiled with the distributed identifiers.

As illustrated in block 504, the process continues by initiating a consensus for the distributed identifiers within the block. In this portion of the process, specially designated miner nodes are configured to accept the block to be published to the distributed ledger, and perform a consensus mechanism to search the distributed ledger(s) to ensure that any given distributed identifier assigned within the block is unique and does not exist elsewhere along any distributed ledger. Consensus mechanisms are essential in agreeing on the distributed identifier. Examples of consensus mechanisms which may be utilized are proof of work (PoW), proof of stake (PoS), proof of capacity (PoC), proof of activity (PoA), proof of burn (PoB), proof of elapsed time (PoET), or the like. Consensus may be performed by one miner node, but preferably multiple miner nodes simultaneously.

Block 506 illustrates the actions undertaken by miner nodes while executing the consensus mechanism. As previously explained, the consensus mechanism is essential to ensure that a distributed identifier which has been generated by the system is unique, such that users, user devices, and other nodes along the system have confidence in the data being referenced by the distributed identifier. In certain circumstances, a distributed identifier may be generated by the system which is not unique (e.g. there are recorded distributed identifiers on the distributed ledger which share the same distributed identifier number), and as such the process during these instances continues to block 508, wherein a new distributed identifier is generated for one or all of the distributed identifiers within a block. The comparison is made by checking each of the distributed identifiers within a block to the recorded distributed identifiers on the distributed ledger. Thereafter, it may be necessary to compile the distributed identifiers into a block once again and as such the process returns to block 502 to complete this compilation. Thereafter, a consensus must then be reached, so the process continues to blocks 504 and 506 as previously described.

Once a consensus has been reached, the block is transmitted to all nodes in the distributed network as shown in block 510, and each node may express their acceptance of the block, either by appending the block to the appropriate ledger(s), taking no action, or in certain cases such as miner nodes, the miner nodes may accept the consensus by taking any of the aforementioned actions and continuing with the consensus mechanism of the next block in the queue. Once a miner node reaches a consensus, the consensus is broadcast to all nodes, whereafter the other miner nodes express their acceptance of the block by working on the next block in the chain.

FIG. 6 illustrates a non-limiting example of a method for generating a distributed identifier by transforming an information entry. As shown in block 604, the system is configured to receive a command to initiate the generation of a distributed identifier. Proceeding to block 606, the miner nodes of the system use a hash function for each information entry. Information entries are identifiers used by an entity to designate account numbers, personal information, and the like. The format of an information entry may take an infinite number of forms, comprising numbers, letters, symbols, or the like. One of the many advantages to the distributed identifier process as described is that it is agnostic to the types of inputs to the generation method, and the distributed identifier generation method may be applied to an entity with a diverse number of information entries throughout the entity. For example, an entity may provide account numbers to users which only comprise numbers, whereas the same entity may also store the user's name and other personally identifiable information in data labeled with entirely alphabetic characters. In either way, these information entries are provided to the distributed identifier generation process with the ultimate output being a distributed identifier comprising only numbers. In this way, diverse styles of information entries are transformed into similar style distributed identifiers, such that communication between domains and/or nodes is optimized and standardized.

In block 606, the system uses a hash function, which generates numerical values for each character provided to the hash function. The hash function typically will refer to a hash table to map the data in the information entry to an integer value. The information entry may be mapped to a fixed size or a variable size depending on the input to the hash function and the configuration of the hash function itself. In some embodiments of the invention, the hash table may only be available to a superuser or the originating node, such that all other nodes in the system are not privy to the underlying information entry. However, the system may also be configured to allow for hash tables to be distributed to other nodes, miner nodes, user devices, or the like, such that the same hash function and table which derived the transformed information entry may be used to translate the transformed information entry back to its original values. In this way, the information entry is encrypted to anyone attempting to conduct malfeasance upon the system, and if a database shows "John Doe, Account Number 12345," without the hash table the only information that may be obtained from such an activity is a hashed value such as "389592004." The type of hashing conducted by the system is preferably by generating 64-bit binary values for each character string input, configured to allow for aggregation and ranking. It shall also be noted that alternate hashing mechanisms such as secure hash algorithms (SHA-1, SHA-2, SHA-3, etc.) and message-digest hash functions (MD2, MD4, MD5) may be used in some embodiments of the invention. One or more outputs of hash functions are summed together such as to add a first output of a hash function to a second output of a hash function.

The sum of the outputs of hash functions in block 606 is provided to a rank function in block 608, such as to arrange and rank the sum of the output of the hash functions. As such the ranking function may serve to allow for fast similarity searching, indexing, or the like. From there, and as shown in block 610, the output of the rank function is added to a maximum distributed identifier. The maximum distributed identifier is the value of the previous distributed identifier from the existing distributed network. This ensures that the new distributed identifier will be greater in value than the previous, and thereby ensure that the order in which distributed identifiers are added to the distributed ledger(s) on the distributed network are chronological. The output of the distributed identifier generation, a distributed identifier, is illustrated by block 612.

The distributed identifier generation as previously described, will now be shown graphically in FIG. 7. Block 702 represents the portion of the Distributed ID function configured to perform a loop function, where the term i represents the new information entry to which the distributed identifier function is to perform, and N represents the total number of new information entries for processing by the function in block 704. In this way, the function performs on each information entry before continuing to the next information entry. Block 710 represents the rank function, as previously described in FIG. 6, and block 712 represents the hash function (also previously described). Moreover, block 706 illustrates information entries within the rank and hash functions, which will be processed. It shall be noted that in this non-limiting example of distributed identifier generation, three information entries are shown by block 706. However, the same principles and methodologies apply to the generation of distributed identifiers, no matter whether there is a single information entry, or a plethora of information entries. Block 712 further illustrates the hash function as previously described, wherein each information entry is transformed by the hash function.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for securing information in a distributed network via a distributed identifier, the system comprising:
    a memory device with computer-readable program code stored thereon;
    a communication device;
    a processing device operatively coupled to the memory device and the communication device, wherein the processing device is configured to execute the computer-readable program code to:
        receive an information entry from one or more domains, wherein the one or more domains comprise one or more nodes of a distributed network, and wherein the information entry is provided to an originating node;
        store the information entry on a distributed ledger of the distributed network;
        receive a command to generate a distributed identifier for the information entry, wherein the distributed identifier is a generated number associated with the information entry based on information contained in the information entry;
        broadcast the distributed identifier generation to a plurality of nodes in the distributed network upon receiving the command;
        generate the distributed identifier, wherein the distributed identifier masks the information entry;
        compile the distributed identifier with one or more preexisting distributed identifiers into a block;
        initiate a block consensus, wherein the block consensus comprises a miner node verifying originality of the distributed identifier and the one or more preexisting distributed identifiers of the block;
        obtain the block consensus from the miner node, wherein the miner node has confirmed that the distributed identifier and the one or more preexisting distributed identifiers is unique by comparing the block to any recorded distributed identifiers in the distributed ledger; and
        transmit the block to the distributed network, wherein the block is appended to the distributed ledger.

2. The system of claim 1, wherein generating the distributed identifier comprises:
    initiating the distributed identifier generation;
    receiving the information entry from the one or more domains;
    applying a hash function to the information entry, wherein the information entry comprises one or more character strings;
    applying a summing function to outputs of the hash function, wherein the outputs of the hash function comprises a value for each of the one or more character strings based on a hash table; and
    summing with a maximum distributed identifier, wherein the maximum distributed identifier is determined from the distributed ledger.

3. The system of claim 1, further comprising generating a new distributed identifier if the distributed identifier is not unique.

4. The system of claim 1, wherein receiving the command to generate the distributed identifier for the information entry further comprises miner nodes of the distributed network prioritizing the command to generate the distributed identifier with a plurality of commands to generate distributed identifiers.

5. The system of claim 1, wherein the distributed network and distributed ledger are controlled by an entity, such that only a superuser and the one or more domains are capable of accessing the information entry associated with the distributed identifier.

6. The system of claim 1, wherein masking the information entry further comprises supplying a hash table to the originating node and a superuser, while not allowing access to the hash table by other nodes in the distributed network.

7. A computer program product for securing information in a distributed network via a distributed identifier, the computer program product comprising at least one non-transitory computer-readable medium having computer-readable program code portions embodied therein, the computer-readable program code portions comprising:
    receiving an information entry from one or more domains, wherein the one or more domains comprise one or more nodes of a distributed network, and wherein the information entry is provided to an originating node;
    storing the information entry on a distributed ledger of the distributed network;
    receiving a command to generate a distributed identifier for the information entry, wherein the distributed identifier is a generated number associated with the information entry based on information contained in the information entry;
    broadcasting the distributed identifier generation to a plurality of nodes in the distributed network upon receiving the command;
    generating the distributed identifier, wherein the distributed identifier masks the information entry;
    compiling the distributed identifier with one or more preexisting distributed identifiers into a block;
    initiating a block consensus, wherein the block consensus comprises a miner node verifying originality of the distributed identifier and the one or more preexisting distributed identifiers of the block;

obtaining the block consensus from the miner node, wherein the miner node has confirmed that the distributed identifier and the one or more preexisting distributed identifiers is unique by comparing the block to any recorded distributed identifiers in the distributed ledger; and transmitting the block to the distributed network, wherein the block is appended to the distributed ledger.

8. The computer program product of claim 7, wherein generating the distributed identifier comprises:

initiating the distributed identifier generation;

receiving the information entry from the one or more domains;

applying a hash function to the information entry, wherein the information entry comprises one or more character strings;

applying a summing function to outputs of the hash function, wherein the outputs of the hash function comprises a value for each of the one or more character strings based on a hash table; and summing with a maximum distributed identifier, wherein the maximum distributed identifier is determined from the distributed ledger.

9. The computer program product of claim 7, further comprising generating a new distributed identifier if the distributed identifier is not unique.

10. The computer program product of claim 7, wherein receiving the command to generate the distributed identifier for the information entry further comprises miner nodes of the distributed network prioritizing the command to generate the distributed identifier with a plurality of commands to generate distributed identifiers.

11. The computer program product of claim 7, wherein the distributed network and distributed ledger are controlled by an entity, such that only a superuser and the one or more domains are capable of accessing the information entry associated with the distributed identifier.

12. The computer program product of claim 7, wherein masking the information entry further comprises supplying a hash table to the originating node and a superuser, while not allowing access to the hash table by other nodes in the distributed network.

13. A computer-implemented method for securing information in a distributed network via a distributed identifier, the method comprising:

providing a computing system comprising a computer processing device and a non-transitory computer readable medium, where the non-transitory computer readable medium comprises configured computer program instruction code, such that when said computer program instruction code is operated by said computer processing device, said computer processing device performs the following operations:

receiving an information entry from one or more domains, wherein the one or more domains comprise one or more nodes of a distributed network, and wherein the information entry is provided to an originating node;

storing the information entry on a distributed ledger of the distributed network;

receiving a command to generate a distributed identifier for the information entry, wherein the distributed identifier is a generated number associated with the information entry based on information contained in the information entry;

broadcasting the distributed identifier generation to a plurality of nodes in the distributed network upon receiving the command;

generating the distributed identifier, wherein the distributed identifier masks the information entry;

compiling the distributed identifier with one or more preexisting distributed identifiers into a block;

initiating a block consensus, wherein the block consensus comprises a miner node verifying originality of the distributed identifier and the one or more preexisting distributed identifiers of the block;

obtaining the block consensus from the miner node, wherein the miner node has confirmed that the distributed identifier and the one or more preexisting distributed identifiers is unique by comparing the block to any recorded distributed identifiers in the distributed ledger; and transmitting the block to the distributed network, wherein the block is appended to the distributed ledger.

14. The computer-implemented method of claim 13, wherein generating the distributed identifier comprises:

initiating the distributed identifier generation;

receiving the information entry from the one or more domains;

applying a hash function to the information entry, wherein the information entry comprises one or more character strings;

applying a summing function to outputs of the hash function, wherein the outputs of the hash function comprises a value for each of the one or more character strings based on a hash table; and summing with a maximum distributed identifier, wherein the maximum distributed identifier is determined from the distributed ledger.

15. The computer-implemented method of claim 13, further comprising generating a new distributed identifier if the distributed identifier is not unique.

16. The computer-implemented method of claim 13, wherein receiving the command to generate the distributed identifier for the information entry further comprises miner nodes of the distributed network prioritizing the command to generate the distributed identifier with a plurality of commands to generate distributed identifiers.

17. The computer-implemented method of claim 13, wherein masking the information entry further comprises supplying a hash table to the originating node and a superuser, while not allowing access to the hash table by other nodes in the distributed network.

18. The computer-implemented method of claim 13, wherein the distributed network and distributed ledger are controlled by an entity, such that only a superuser and the one or more domains are capable of accessing the information entry associated with the distributed identifier.

* * * * *